(No Model.) 3 Sheets—Sheet 1.

E. E. RIES.
PORTABLE ELECTRIC WELDING APPARATUS.

No. 444,855. Patented Jan. 20, 1891.

Witnesses:

Inventor,
Elias E. Ries,
By Joseph Lyons
Attorney.

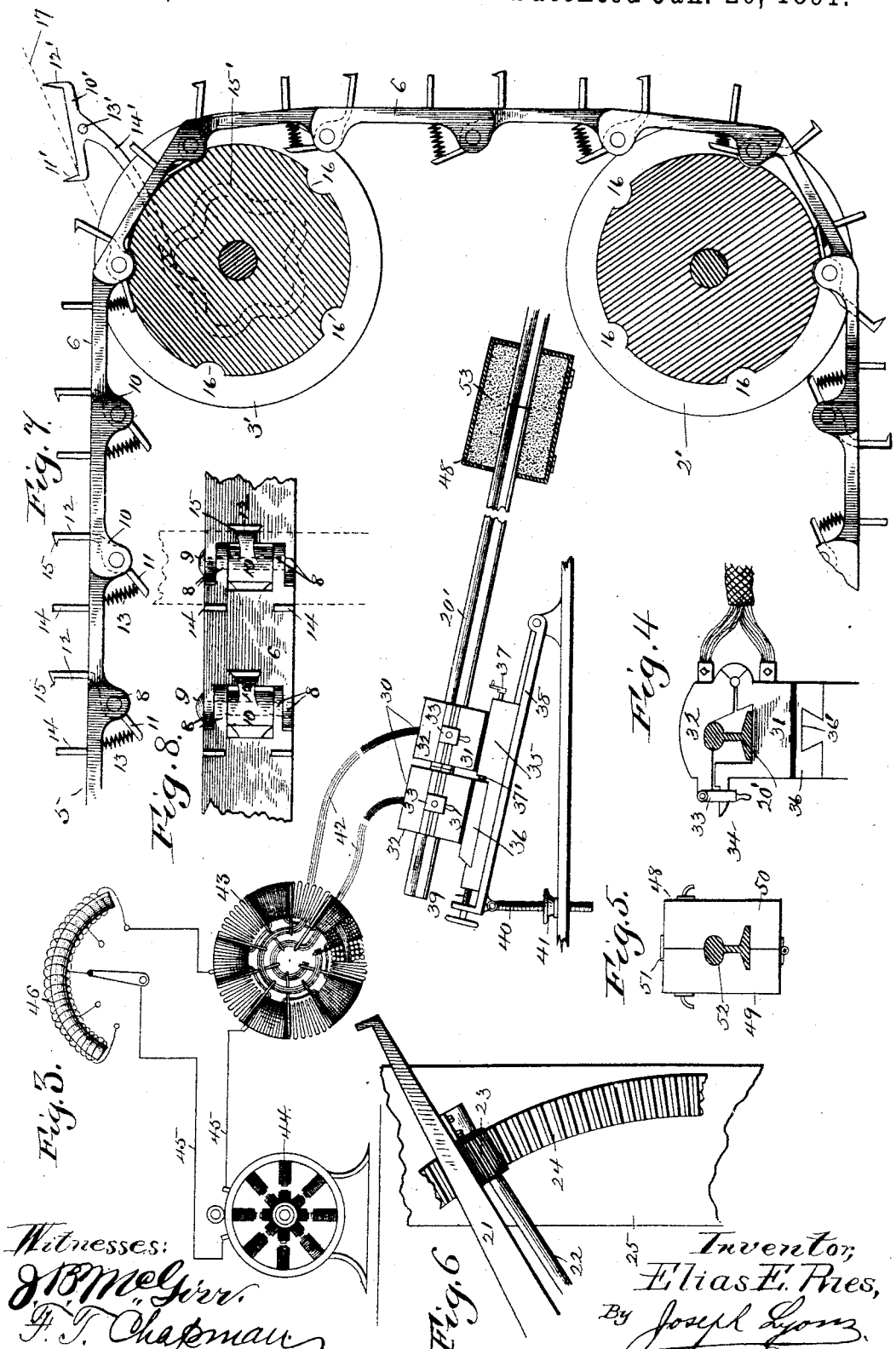

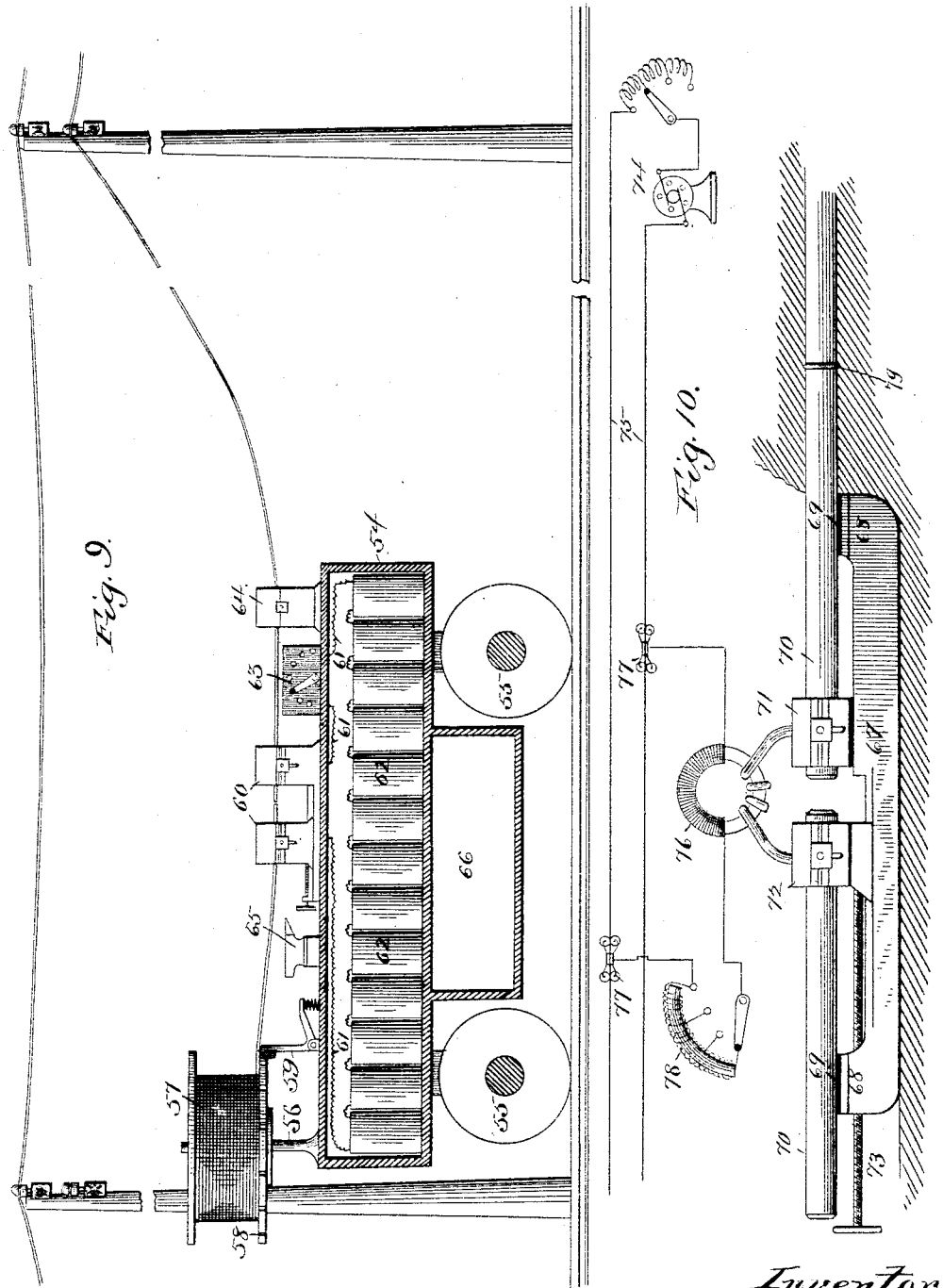

UNITED STATES PATENT OFFICE.

ELIAS E. RIES, OF BALTIMORE, MARYLAND.

PORTABLE ELECTRIC WELDING APPARATUS.

SPECIFICATION forming part of Letters Patent No. 444,855, dated January 20, 1891.

Application filed August 2, 1890. Serial No. 360,743. (No model.)

*To all whom it may concern:*

Be it known that I, ELIAS E. RIES, a citizen of the United States, and a resident of Baltimore, in the State of Maryland, have invented certain new and useful Improvements in Portable Electric Welding Apparatus, of which the following is a specification.

My invention has reference to portable electric welding apparatus in which the ultimate or the proximate generator of the welding-current, or both, can be transported from place to place, together with the welding-clamps, switches, rheostats, and accessory devices, and more especially along a line on which at predetermined intervals electric welding is to be practiced for the production of continuous structures, as shown and described, but not claimed in my Letters Patent, No. 370,282, dated September 20, 1887.

The invention is applicable to the construction of lines of rail, or pipe, or wire, as in the building of ordinary and electric railways, water or gas conduits, and telegraph or electric light or power trunk lines. My invention, therefore, will necessarily assume a variety of forms, according to the nature of the work to which it is applied; but all these forms have this in common, that the welding-clamps, the proximate source of the welding-current, and the whole outfit necessary for producing electric welds can be transported from place to place or from joint to joint along the structure to be welded without disturbing their co-operative relations.

While my invention is thus adapted to all kinds of work, as above stated, it is especially important for the production of continuous lines of rails for railway traffic, since by the use of my apparatus I am enabled to make continuous rail-sections of any desired length, thus not only avoiding entirely the use of fish-plates and their attendant fastening devices, such as bolts, nuts, washers, nut-locks, &c., or reducing the number of such fish-plates to any desired minimum, but also providing a perfectly smooth, uniform, and unbroken surface for the wheels of the traveling vehicles.

In the accompanying drawings, which form a part of this specification, I have therefore illustrated the apparatus for welding railway-rails with special detail. I have also shown two forms of apparatus, of which one is particularly adapted for the production of continuous telegraph and other electric line conductors, and the other for the production of a continuous line of pipe.

Figure 1:
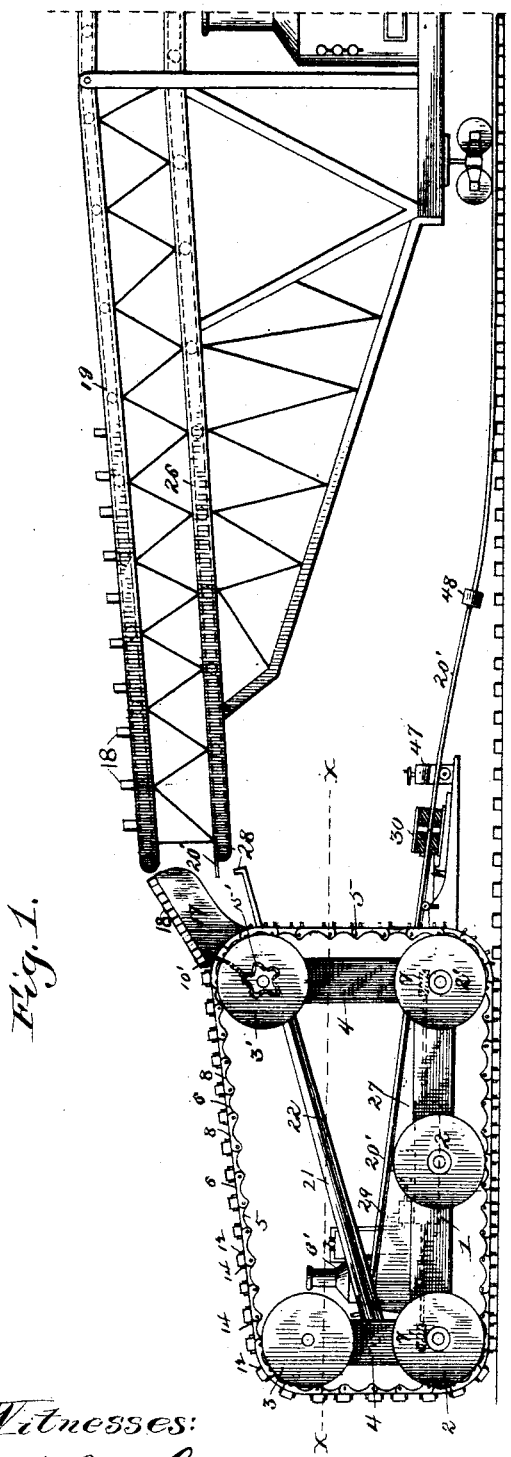
Figure 2:
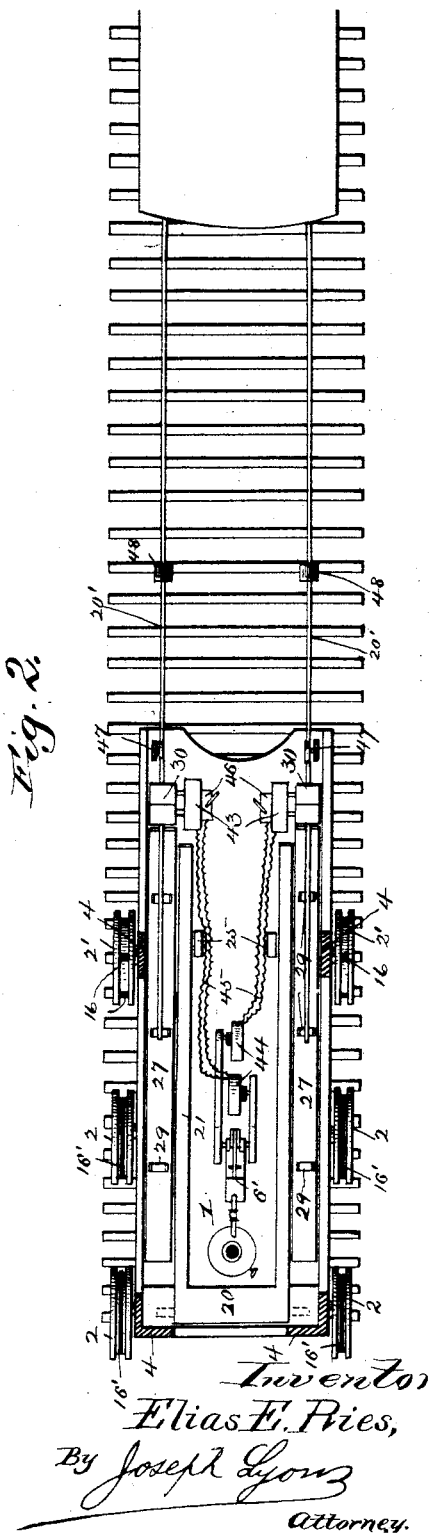

Figure 1 is a side elevation of a portable welding apparatus particularly adapted for welding and laying railway-rails in the construction of continuous lines of track. Fig. 2 is a section of the same in the line $x\,x$ of Fig. 1. Fig. 3 is a side elevation of rail-welding clamps and the mounting therefor, and also includes a sectional view of a tempering-box for the welded joint and a diagram of the current-generating devices and circuit connections. Fig. 4 is an end view of one of the welding-clamps with the rail in place, and shown in cross-section. Fig. 5 is a similar view of the tempering-box. Fig. 6 is a side view of a portion of the pivoted rail-receptacles and the operating mechanism therefor. Fig. 7 is an enlarged side elevation of a portion of the endless tie-carrier and depositor with the supporting-drums in section. Fig. 8 is a plan view of a portion of the endless tie-carrier and depositor shown in Fig. 7. Fig. 9 is a longitudinal sectional elevation of a portable welding apparatus for constructing and repairing telegraph or other line wires; and Fig. 10 is a side elevation, partly in diagram, of a portable welding apparatus for constructing and repairing continuous lines of pipe, in which the primary current is generated at a fixed distant station.

Referring to the drawings, and more particularly to Figs. 1 to 7, inclusive, there is shown a portable track laying and welding apparatus, consisting, essentially, of suitable carriers for transporting the rails and ties from the cars on which they are loaded to the truck to which they are to be conveyed, which truck is provided with mechanism for receiving and depositing the said ties and rails, and also with a generator of electricity, and suitable electric welding apparatus, by means of which latter the rail-sections of ordinary length are welded together to form continuous rails of comparatively great length. The truck consists, essentially, of a platform 1, mounted in any suitable manner upon grooved wheels 2 and 2′. On each side of the truck and directly above the end wheels 2 2′ are other and similar wheels 3 3', mounted in suitable bearings carried by posts or standards 4, rising from the platform 1. Extending around the several wheels on each side of the truck there is an endless chain 5, composed of comparatively long flat links 6. This chain, as will hereinafter appear, constitutes an endless track upon which the truck travels, there being an engine 6', of any approved pattern, mounted on the truck, and by means of worm-gearing 7 (indicated in dotted lines, Fig. 1) this engine causes the end wheels 2 2' on each side of the truck to slowly rotate and move the chain around them in a manner readily understood. Instead of the steam-engine 6', an electric motor, preferably operated from the source that supplies the welding-current, may be used.

The particular construction of the chain is clearly shown in Figs. 7 and 8, in which it will be seen that each link has ears 8 formed at its ends, the ears of one link entering between those of the other, and the several links are pivoted together by pins 9, extending through the ears, which latter are located at or near the corners of the links, so that there is an intermediate space or opening between them. Pivoted on each pin 9 there is a lever 10, having arms 11 12 projecting from opposite sides. The arm 11 has interposed between its free end and the corresponding side of the respective link a spring 13, which tends by expansion to retain the arm 12 in a position approximately at right angles to the said link. This arm 12 has its free end bent at an angle to the main portion, so that it is approximately parallel to fingers 14, erected on opposite sides of one face of each link, near one end thereof, and at the extremity of the said arm 12 there is formed a tooth 15, facing the fingers 14, in such manner that any object placed between said arm and fingers, so as to be grasped thereby, will be held against accidental displacement. Each wheel 2' 3' has a number of notches or recesses 16 formed in the bottom of the groove, and these notches are so spaced that the ears, which, as will be seen, project from the inner face of each link, will enter these notches as the wheels or rollers are rotated, thus moving the chain forward. Mounted upon the rear posts 4 so as to be in line with the chains as they pass over the rear wheels 3' there is an inclined way 17, so arranged that ties 18, received thereon from a suitable carrier 19, coming from some portion of the construction-train, (not shown,) will be conveyed to the chains just before they leave the rear wheels 3'.

In order to regulate the feed of the ties to the chains so that they will fall at the proper moment from the way 17 onto the said chains in such position that they will be grasped between the arms 12 and fingers 14, there are two detents 10', pivotally mounted to the sides of the inclined way or chute 17. Each detent is provided with two fingers 11' 12', and is pivoted at a point 13' in such manner that it may be rocked to project either of the fingers 11' or 12' above the surface of the said way 17 in the path of a tie sliding down the same. When the detent is so rocked that the finger 11' is above the way, a tie sliding down the latter will be caught by the said finger and held against further movement, and other ties on the way 17 will be held by the first tie. If now the detent be rocked on its pivot so as to depress the finger 11' and raise the finger 12', the latter will enter between the lowermost tie and the next adjacent one, while the finger 11' will be withdrawn from the front of the lowermost tie, and the latter will be free to slide down onto the chain 10, while the remaining ties are held against movement by the finger 12'. If the detent be again rocked on its pivot so as to elevate the finger 11' and depress the finger 12', the ties held by the said finger 12' will slide down the way 17 until caught by the finger 11'. This movement of the detent on its pivot is continued at suitable intervals, so that the ties are released and are allowed to fall successively on the chain at the proper instant.

In order to effect the oscillation of the detents on their pivots, each is provided with an arm 14', the free end of which engages in a cam-groove 15', (indicated in dotted lines in Fig. 7,) formed on the inner face of the adjacent upper rear wheel 3'. It will be understood that the contour of the cam-grooves is such that the detents will be rocked on their pivots to release the ties and permit them to fall onto the chain at the exact instant that the arms 12 and fingers 14 are in position to receive the same. It will be observed that at the points where the chains pass over the rear wheels 3' the arms 12 of the levers 10 have been moved away from the fingers 14 by the movement of the levers 10, caused by the wheels engaging the arms 11 and forcing them toward the chain-links against the action of the springs 13. This leaves ample room for the ties to drop in succession between the arms 12 and fingers 14, and as the chains pass from the roller the springs 13 will force the arms 11 away from the links, causing the teeth 15 to engage the ties and hold them against accidental displacement. It will be understood that the ties are grasped near their ends by the two chains simultaneously and are carried forward over the forward wheels 3 and down and under the forward wheels 2, the bottoms of the grooves in these wheels being provided with annular depressions 16', (see Fig. 2,) into which the arms 11 extend, and the arms 12 are therefore not forced away from the ties, and the latter are securely held as they are carried over the said wheels. The ties are finally placed on the ground by the passage of the chains under the several wheels 2 on each side of the truck as the latter moves forward. When, however, one of the arms 11 of each chain reaches the rear wheel 2', the respective arm 12 is drawn away from the tie, and the chain being no longer secured to the latter moves away therefrom and upward toward the rear wheel 3'. This operation is repeated by the several levers in succession and the ties are left on the road-bed at equal distances apart and ready to receive the rails, and it may be continued for the distance of the length of a rail or as long as desired, the truck advancing as the ties are deposited and riding over them, as on a track.

Pivoted at one end and at a distance above the floor of the platform 1 there is a frame 20, having two parallel arms 21, located at a short distance from the sides of the truck and on opposite sides of the driving-engine 6', the latter being situated centrally on the said platform 1. The arms 21 extend nearly to the rear end of the truck-platform, and near the free end each arm carries a bearing for a shaft 22, carrying a pinion 23, meshing in a sector-rack 24, mounted on a post or standard 25, erected on the platform 1. The shafts 22 (there being one for each arm 21) are operated either mechanically or by hand and serve to elevate or lower the free ends of the frame 20, which is constructed to receive railway-rails 20', of the usual or ordinary length, from suitable carriers 26 coming from some portion of the construction-train. When two or more rails have been properly placed on the arms 21, the latter are lowered until on a line with inclined receiving-ways 27, provided with guides or rollers 29, to which the rails are transferred, and the latter are then at approximately the distance apart required by the gage of the road to be constructed.

At the lower or rear end of and in line with each way 27 there is a pair of welding-clamps 30. (Shown in detail in Figs. 3 and 4.) Each clamp consists of two jaws 31 32, suitably recessed to receive and clamp the rail, the upper jaw 32 being hinged at one side to the jaw 31 and at the other side provided with a latch 33, engaging over a nose 34 on the jaw 31, so that the clamp may be opened to readily receive the rail and then closed and locked to hold it firmly in position. One of the clamps is fixed on but insulated from a bed-plate 35 and the other clamp is fixed on but insulated from a carrier 36, which, together with the clamp, is free to be moved by hand or gravity on the bed-plate 35, being held thereto by a dovetail guide 36' entering a similar groove in the carrier 36. The movement of the carrier and clamp thereon toward the fixed clamp is limited by an adjustable screw-rod 37, one end 37' of which projects into the path of the said carrier. (See Fig. 3.)

In order to secure an accurate adjustment of the fixed clamp upon the end of the rail-section already laid, the bed 35 is in turn mounted upon another bed 38 and is adjusted thereon by means of a screw-shaft 39 in a manner well understood. The bed 38 is pivoted at one end either to the platform 1 or to a suitable base-plate mounted thereon, and the other or free end is adjustable vertically by means of a screw-rod 40 and nut 41, as clearly shown in Fig. 3. The two welding-clamps, insulated one from the other, as described, are connected by heavy conductors 42 to the terminals of the secondary of a transformer 43 of any suitable construction, and which receives high-tension alternating currents from a dynamo 44 (driven by the engine 6') by means of conductors 45, the circuit of which includes a rheostat or choking-coil 46. As shown in Fig. 2, there are two sets of welding-clamps, two transformers, and two dynamos, the arrangement being such that the rail ends may be welded independently, and, if desired, simultaneously, on each side of the truck. On the extreme rear end of the platform there are mountings 47, carrying guide-rollers for the rails projecting beyond the platform 1. It will now be understood that one end of a rail on each side of the truck is clamped between the pair of welding-jaws forming the fixed clamp, while the contiguous end of the rail resting upon the way 27 is clamped between the welding-jaws forming the movable clamp, a small portion of each rail being allowed to project slightly beyond the contiguous faces of the clamps. The ends of the rails are then brought into contact; but when in this position the carrier 36 has not yet come into contact with the end 37' of the screw-rod 37. If now a powerful heating-current of electricity is passed between these contacting ends, they will be quickly brought to a state of incipient fusion, and the weight of the rail on the way 27, forcing the movable clamp toward the fixed clamp until stopped by the rod 37, will upset the softened rail ends, and thereby complete the electric welding of the said ends. As soon as the welding of each set of rails is completed and before they have had time to cool, or after the rails are reheated, the clamps are removed, the truck is moved forward, and a tempering-box 48 is applied to the joint to restore the temper lost during the operation of welding. In some cases this process of tempering may prove troublesome in that it requires prompt and rapid manipulation. I may therefore apply the tempering-box after the weld has been cooled, and reheat the weld by passing a current through the same by means of separate clamp terminals. The forward motion of the truck or welding-carriage is then continued, the newly-welded rail-sections in the meantime passing idly through the now open clamps until the other or free ends of the welded rails are approximately in position to be again clamped by the fixed welding-clamps. The screw-shaft 39 is then operated to move the bed 35 along the inclined bed 38 until the fixed clamp is in the exact position to clamp the rail ends. The other clamp is then moved away from the fixed clamp and one end of a rail-section on the ways 27 is inserted, clamped, and brought into contact with the end of the welded rail, and the operation of welding and tempering is repeated. It will thus be understood that the forward movement of the truck and the welding of the rails take place alternately. Therefore the power of the engine 6' need only be proportionate to that required for either, but not both operations, at the same time. It will also be understood that the welding truck or carriage may carry the construction-train with it, or it may be supplied with a number of ties and rails and then be moved forward, laying the track, until the said supply is exhausted, after which the construction-train may be drawn up to the truck by means of a power-windlass or any other suitable and well-known means carried by the said truck and operated by the engine thereon.

The tempering-box 48 consists, essentially, of two rectangular receptacles 49 50, hinged together at one side and provided with a latch or other suitable fastening device 51 at the other side, and having at the ends suitably-shaped openings 52, which will just admit the passage of the rails when the box is closed. The interior of the box is filled with a suitable hardening or tempering compound 53.

While I have described in detail the construction of the welding-clamps, tempering-box, and other mechanism, I desire it to be understood that my invention is in no manner limited to such construction or dependent upon the same. Any other welding apparatus may be used in conformity with my invention which embraces all such apparatus, provided the same is made portable, so as to be movable along the line or structure operated upon.

Referring now to Fig. 9, there is shown an apparatus particularly adapted for joining the ends of the wires of telegraph or other lines, either in the construction or in the repair of the same. The apparatus is preferably mounted within and upon a box 54, which in turn is mounted upon wheels 55, so that it may be readily transported from place to place. Upon telegraph or other lines or alongside of a railroad-track the box will be mounted on wheels adapted to travel on the said track; but otherwise the wheels will be of ordinary construction, such as are used on wagons. Near one end of the box there is erected a spindle 56, carrying a reel 57, containing a supply of wire of suitable gage. One flange of the reel may be provided with a series of ridges 58, and is engaged by a spring-actuated brake 59, pivoted to the top of the box 54, and which prevents the accidental turning of the reel. This brake may be so formed as to engage the ridges 58, and so hold the reel positively at definite points, but will also hold the reel at intermediate points by friction alone. At a suitable point on the said box 54 there is a pair of welding-jaws 60, one movable in relation to the other and insulated therefrom, and may be similar to those described with relation to the rail-welding apparatus illustrated in Figs. 1 to 7, except that the working-faces of the clamps are adapted to grasp wire instead of rails. These clamps are respectively connected by suitable conductors 61 to the terminals of a battery 62, located within the box 54. By preference I use a secondary or storage battery, the elements of which are so coupled as to supply a current of sufficiently large volume for the work to be performed. In one of the conductors 61 is interposed a current-regulating device, which may be a rheostat or choking-coil 63, conveniently located on top of the box 54. Near the end of the box opposite that on which is mounted the reel 57 there is a gripping device 64 of any suitable or improved construction. When it is desired to join the ends of two wires to form a continuous line structure, the end of one of the wires, which may be already secured to a telegraph or other supporting pole, is placed in one of the clamps 60 with its extreme end projecting slightly toward the other clamp 60, which latter in the present instance is shown as a movable clamp. The wire is also placed in the gripper 64, so that the strain caused by the weight of the wire between the welding device and the pole to which it is secured is borne by the said gripper instead of by the welding-clamps. The end of the wire carried by the reel is fixed to the movable clamp 60, so that it projects a short distance beyond the latter and is in contact with the projecting end of the main wire. The current from the battery is now allowed to pass between the contacting ends of the wire and heats the latter to a state of incipient fusion, when by moving the clamps together the wires are welded in a manner well understood, while at the same time the current is suitably regulated by the rheostat or choking-coil 63. Other devices than those described may be mounted on the box 54, and I have shown an anvil 65 suitably located thereon, which is used for condensing the joint by hammering. Beneath the box 54 there is a compartment 66 for containing tools and special appliances.

It will be seen that by the use of the apparatus described with reference to Fig. 9 telegraph, electric-light, electric-railway, and other conducting lines may be constructed and erected or laid upon proper supports in continuous lengths or sections without the usual objectionable joints, and also that welded joints may be formed at any required point in line-wires with the greatest facility and comfort, it only being necessary to move the apparatus from point to point along the line of the structure being erected or from one joint to the next to be formed.

Referring now to Fig. 10, there is shown a modification of my portable welding apparatus designed more particularly to be used in trenches for welding together sections of pipe to form continuous line structures having welded joints. This apparatus is so constructed as to be readily transported from place to place, and can be easily moved along a trench from one joint to another as the pipes are laid, so that their contiguous ends may be welded together. The apparatus consists, essentially, of a bed-piece 67, having its ends slightly upturned, as shown at 68, and each provided with a bearing-face 69, of insulating material, forming rests for pipe-sections 70 to be welded together, and arranged so as to hold the said sections in alignment. About midway of the bed there is secured a welding-clamp 71, suitably insulated therefrom and having its jaws properly shaped to grasp a pipe. Mounted on a depressed portion of the bed 67 in such manner as to be readily movable lengthwise thereon there is another welding-clamp 72, actuated by means of a screw-rod 73, extending to a nut formed in the adjacent upturned end 68 of the bed. The upturned ends 68, as well as the clamps 71 72, are preferably provided with one of a series of removable rests and dies, respectively, that are made to receive pipes or tubes of any desired shape or diameter. It will at once be apparent that pipe-sections carried by the clamps may be readily brought into contact, and on the passage of a suitable current be heated to the proper degree and upset, so as to form a welded joint. In this figure the current-generating devices are shown diagrammatically. An alternating-current dynamo 74 or other suitable source of current is located at some distant point, and conductors 75 are extended along the line of the trench in which the pipe is to be laid. Accompanying the welding-clamps is a transformer 76, having its secondary connected with the said clamps and its primary connected to trolleys 77, arranged to travel on the conductors 75, so that the welding apparatus may be transported from point to point in the trench without in any manner interfering with the circuit connections or at any time breaking the circuit with the prime generator of the electric current. The rheostat or choking-coil 78 is provided at some point adjacent to the welding apparatus, so that the current passing through the contacting ends of the pipes may be regulated as desired. When a weld has been completed, it is only necessary to turn off the welding-current, open the clamps, move the apparatus to the free ends of the last welded section and secure it in the clamp 71, then introduce a new section, secure its ends in the clamp 72, and bring the two sections in contact, after which the current may be passed and the weld completed, as before. The clamps 71 72 are preferably provided with dies of such shape as to leave a slight ridge 79 completely surrounding the pipe outside of the joint, so as to strengthen the same and render it secure against leakage, and on transferring the welding apparatus to the next joint that portion of the line already completed may be filled in and covered in the usual manner.

It will be understood that while I have shown my invention as applied solely to electric welding operations my portable welding apparatus, with its source of heavy current, clamps, &c., may also be used for other electric metal-working operations in addition to electric welding, and I am therefore not restricted to the latter in applying the same.

Having now fully described my invention, I claim and desire to secure by Letters Patent—

1. A portable welding apparatus for welding and laying continuous metallic structures formed of separate parts, sections, or lengths, the same consisting of a movable frame or platform containing the welding-clamps, means for progressively moving the same along the structure from joint to joint, a source of electric heating-current for said welding-clamps, arranged to move with the same, and means for controlling the heating-current, substantially as described.

2. A portable electric line-welding apparatus comprising a source of heating-current, suitable welding clamps or holders in electrical connection with the same and arranged to grasp the ends of the metals to be united during the welding process, means, substantially as described, for successively feeding additional lengths of the metal designed to form the line structure to the welding clamp or clamps and for progressively moving the welding apparatus along the newly-completed section of the line after each welding operation to the point at which the next joint is to be formed, substantially as described.

3. A welding apparatus for producing continuous lines of metallic structures such as railway-rails and electric conductors, consisting of a wheeled vehicle movable along the line of the structure, a source of electric welding-current and welding-clamps mounted upon the vehicle, and mechanism for delivering or paying out the metals to be welded to the welding-clamps, substantially as described.

4. An electric rail-welding apparatus consisting of a wheeled vehicle adapted to travel upon the road-bed of a railway, a generator of alternating high-tension currents actuated by the driving-power of the vehicle, a converter charged by the generator for producing low-tension welding-currents, and welding-clamps suitably mounted in the lines of the rails of the road, substantially as described.

5. An electric welding or metal-working apparatus comprising a wheeled vehicle containing welding-clamps or other metal-working appliances, a source of power upon said vehicle for driving the same, and connections for utilizing said source of power or a portion thereof for supplying the welding or metal-working electric current, substantially as described.

6. An electric welding or metal-working apparatus comprising a wheeled vehicle containing welding-clamps or other metal-working appliances, a steam-engine mounted on the vehicle for propelling the same, one or more electric generators driven by the steam-engine for supplying the requisite current, and metal-working appliances for utilizing said current, substantially as described.

7. In an apparatus for electrically welding and laying continuous lines of railway-rails, the combination of a wheeled vehicle adapted to travel upon the road-bed, and a tie-carrier and depositor constituting a traveling track of the vehicle and actuated by the driving-power of the same, with a rail-depositor also mounted upon the vehicle, electric welding-clamps in operative relation to the rail-depositor, and a source of electric welding-current, substantially as described.

8. In an apparatus for electrically welding and laying continuous lines of railway-rails, the combination of a wheeled vehicle adapted to travel upon the road-bed, and a rail-depositor for receiving and depositing rails on the line of the track, with welding-clamps and tempering-boxes in operative relation to the rail-depositor, and a source of welding-current, substantially as described.

9. An electric welding or metal-working apparatus consisting of a platform arranged to be moved bodily along the work to the approximate point at which the operation is required, and an auxiliary platform or base carrying the holding or welding clamps mounted upon the first-named platform and independently adjustable thereon, whereby when the apparatus is brought into approximate position an accurate adjustment of the clamps upon the work may be obtained, substantially as described.

10. In an electric welding or metal-working apparatus, the combination of a base-plate or support provided with ways or guides, and a second base-plate carrying the welding or holding clamps, mounted upon the first-named plate or support, and independently adjustable thereon, substantially as described.

11. In an electric welding or metal-working apparatus, the combination of a pivoted base-plate or supporting-table arranged to be inclined from a horizontal position to any desired degree, welding or holding clamps mounted thereon, one or both of which are movable, and an adjustable inclined feeding-platform in line with the welding or holding clamps, whereby the metal pieces to be welded or otherwise operated upon are impelled toward the clamps by gravity, substantially as described.

12. In an electric rail-welding apparatus, the combination, with the pilot truck or carriage, of the inclined supporting-bed and rail-feeding ways, the adjustable welding-clamps on the inclined bed, and the rail receiving and depositing arms, substantially as described.

13. A portable electric welding or metal-working apparatus for joining or uniting together two or more parallel lines of rails, wires, tubes, and similar structures, (while the same are permanently deposited in place,) the same comprising a transformer or other source of electric heating-current, and two or more separate sets of clamps or holders for the work, means for feeding the sections to be united to their respective clamps or holders, and means for contemporaneously joining the ends of the additional sections to those of their respective main structures, whereby the construction of two or more parallel lines may be carried on simultaneously, substantially as described.

14. A portable rail-welding apparatus provided with two sets of welding-clamps separated approximately by the distance of the gage of the track to be laid, each set of clamps being arranged and constructed to electrically unite the rail length on its side of the track, substantially as described.

15. A portable rail welding and depositing apparatus comprising a wheeled vehicle or truck adapted to travel along the support or bed upon which the rails are to be laid, welding-clamps upon said vehicle, a source of heating electric current for said clamps, means for adjusting one of the clamps upon the free end or ends of the rail section or sections welded, and means for feeding an additional rail section or length to the other clamp and for holding the same in alignment during the welding operation, substantially as described.

16. A portable rail welding and depositing apparatus comprising a wheeled vehicle or truck adapted to travel along the support or bed upon which the rails are to be laid, welding-clamps upon said vehicle, a source of heating electric current for said clamps, means, substantially as described, for feeding the rails to the clamps, and a hardening and tempering box for restoring the temper of the welded rails at the joint, substantially as described.

17. A portable electric welding apparatus constructed and arranged to be transported from place to place or from joint to joint along the line of a metallic-line structure, said apparatus having one or more fixed and movable clamps or holders forming the terminals of an electric heating-circuit and arranged to grasp the ends of the line-sections to be joined and to hold the same in proper alignment, means for forcibly approaching the movable toward the fixed clamp during the process of joining the metals, and means for releasing and properly supporting the united sections after union and for transporting the apparatus to the point where the next joint is to be produced, substantially as described.

In testimony whereof I have signed my name to this specification in the presence of two subscribing witnesses.

ELIAS E. RIES.

Witnesses:
LEOPOLD RIES,
LEW. S. GREEVSFELDER.